United States Patent [19]

Gochi

[11] Patent Number: 5,172,342
[45] Date of Patent: Dec. 15, 1992

[54] PORTABLE SEMICONDUCTOR MEMORY UNIT

[75] Inventor: Hidenobu Gochi, Itami, Japan

[73] Assignee: Mitsubishi Denki Kabushiki Kaisha, Tokyo, Japan

[21] Appl. No.: 598,147

[22] Filed: Oct. 16, 1990

[30] Foreign Application Priority Data

Oct. 31, 1989 [JP] Japan .................................. 1-284487

[51] Int. Cl.⁵ ............................................. G11C 13/00
[52] U.S. Cl. ..................................... 365/226; 365/227
[58] Field of Search ................. 365/226, 227, 229, 228

[56] References Cited

U.S. PATENT DOCUMENTS 4,382,279  5/1983  Ugon .

FOREIGN PATENT DOCUMENTS

0350462   6/1989  European Pat. Off. .
3711601  10/1987  Fed. Rep. of Germany .
2144006   2/1985  United Kingdom .
8606205  10/1986  World Int. Prop. O. .

Primary Examiner—Terrell W. Fears
Attorney, Agent, or Firm—Oblon, Spivak, McClelland, Maier & Neustadt

[57] ABSTRACT

A portable semiconductor memory unit comprises a semiconductor memory requiring different voltages for reading and writing. A single supply voltage is supplied to the portable semiconductor memory unit from an external terminal equipment and transformed by a transforming circuit provided in the portable semiconductor memory unit with necessity to be applied to the semiconductor memory. Thus, the terminal equipment does not need to be installed with a dedicated voltage supply circuit for generating different level voltages.

5 Claims, 7 Drawing Sheets

FIG. 5c

PORTABLE SEMICONDUCTOR MEMORY UNIT

BACKGROUND OF THE INVENTION

1. Field of the Invention

The present invention relates to a portable semiconductor memory unit and, more particularly, it relates to portable semiconductor memory units such as an IC card (memory card) provided with only a semiconductor memory and an IC card provided with a CPU together with a semiconductor memory.

2. Description of the Prior Art

Figure 1:
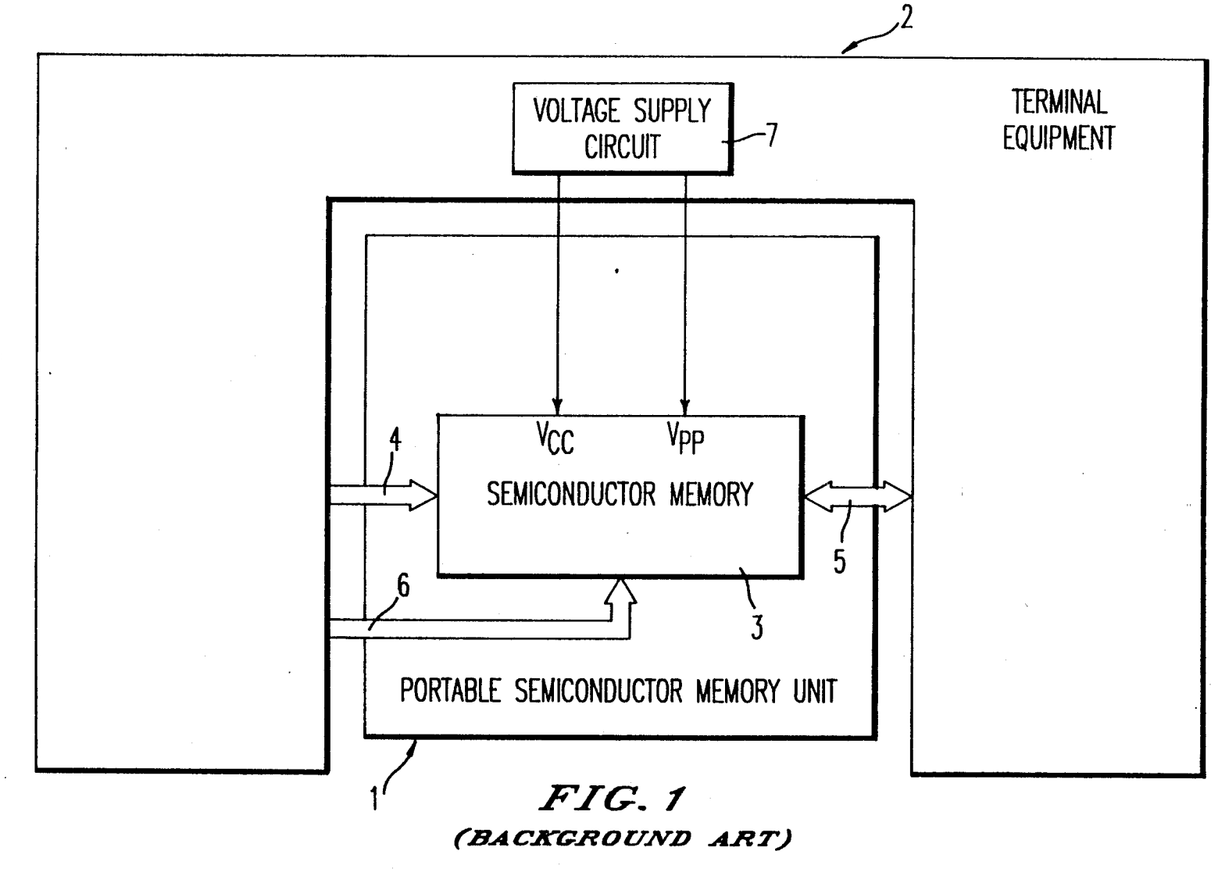
FIG. 1 is a block diagram showing a conventional portable semiconductor memory unit.

FIG. 1 is a block diagram showing a conventional portable semiconductor memory unit and a system to use it. An IC card 1, which is a kind of portable semiconductor memory unit, is provided with a semiconductor memory 3 such as a one time programmable read only memory (OTPROM) and an electrically erasable programmable read only memory ($E^2PROM$) which require different voltages for reading and writing (and erasing). A terminal equipment 2, which is a part of a on-line system, for example, is equipped with an voltage supply circuit 7 for supplying a voltage to the semiconductor memory 3. The voltage supply circuit 7 provides voltages to an operation voltage receiving terminal (Vcc) and a writing voltage receiving terminal (Vpp) of the semiconductor memory 3 installed on the IC card 1. The terminal equipment 2 reads from and writes to the semiconductor memory 3 through a data bus 5 by providing address signals through an address bus 4 and read/write mode and other control signals through a control bus 6.

When the terminal equipment 2 reads data from the semiconductor memory 3 of the IC card 1, the terminal equipment 2 provides the same voltages, for example 5 V, to the operation voltage receiving terminal Vcc and a writing voltage receiving terminal Vpp of the semiconductor memory 3. Thereafter, the terminal equipment 2 provides a read address by the address bus 4, sets a read mode by the control bus 6 and reads data from the semiconductor memory 3 by the data bus 5.

On the other hand, when the terminal equipment 2 writes to the semiconductor memory 3 of the IC card 1, the terminal equipment 2 provides different voltages, for example 6 V and 12.5 V, to the operation voltage receiving terminal Vcc and the writing voltage receiving terminal Vpp of the semiconductor memory 3, respectively. Thereafter, the terminal equipment 2 provides a write address by the address bus 4, sets a write mode by the control bus 6 and writes data to the semiconductor memory 3 by the data bus 5.

Thus, in order to access to the conventional portable semiconductor memory unit such as an IC card, the terminal equipment 2 has to be provided with a dedicated voltage supply circuit 7 capable of generating different voltages when the portable semiconductor memory unit is installed with the semiconductor memory 3 such as PROM and $E^2PROM$ which need different voltages in reading and writing.

SUMMARY OF THE INVENTION

A portable semiconductor memory unit in accordance with the present invention comprises a semiconductor memory which requires different voltages in reading and writing, supply voltage inputting means for receiving a single supply voltage from an outside of the portable semiconductor memory unit, control signal inputting means for receiving a control signal from the outside of the portable semiconductor memory unit, and a transforming circuit connected to the supply voltage inputting means and the control signal inputting means for transforming the supply voltage in accordance with the control signal to apply the same to the semiconductor memory.

According to the present invention, it is unnecessary to provide an external unit with a dedicated voltage supply circuit for generating different voltages, because a transforming circuit set in a portable semiconductor memory unit transforms a single supply voltage applied from the external unit into necessary levels to supply the same to a semiconductor memory when the single supply voltage is different in level from voltages required in writing and reading of the semiconductor memory. Thus various kinds of portable semiconductor memory units can be accessed by the same external unit regardless of whether or not the portable semiconductor memory unit is provided with a semiconductor memory which requires different voltages in writing and reading.

Accordingly an object of the present invention is to provide a portable semiconductor memory unit wherein an external unit needs no dedicated voltage supply circuit for generating different voltages to access the portable semiconductor memory unit.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 4(a1)–4(c2) are block diagrams showing forms of a transforming circuit according to voltages supplied from a voltage supply circuit.

DESCRIPTION OF THE PREFERRED EMBODIMENTS

Figure 2:
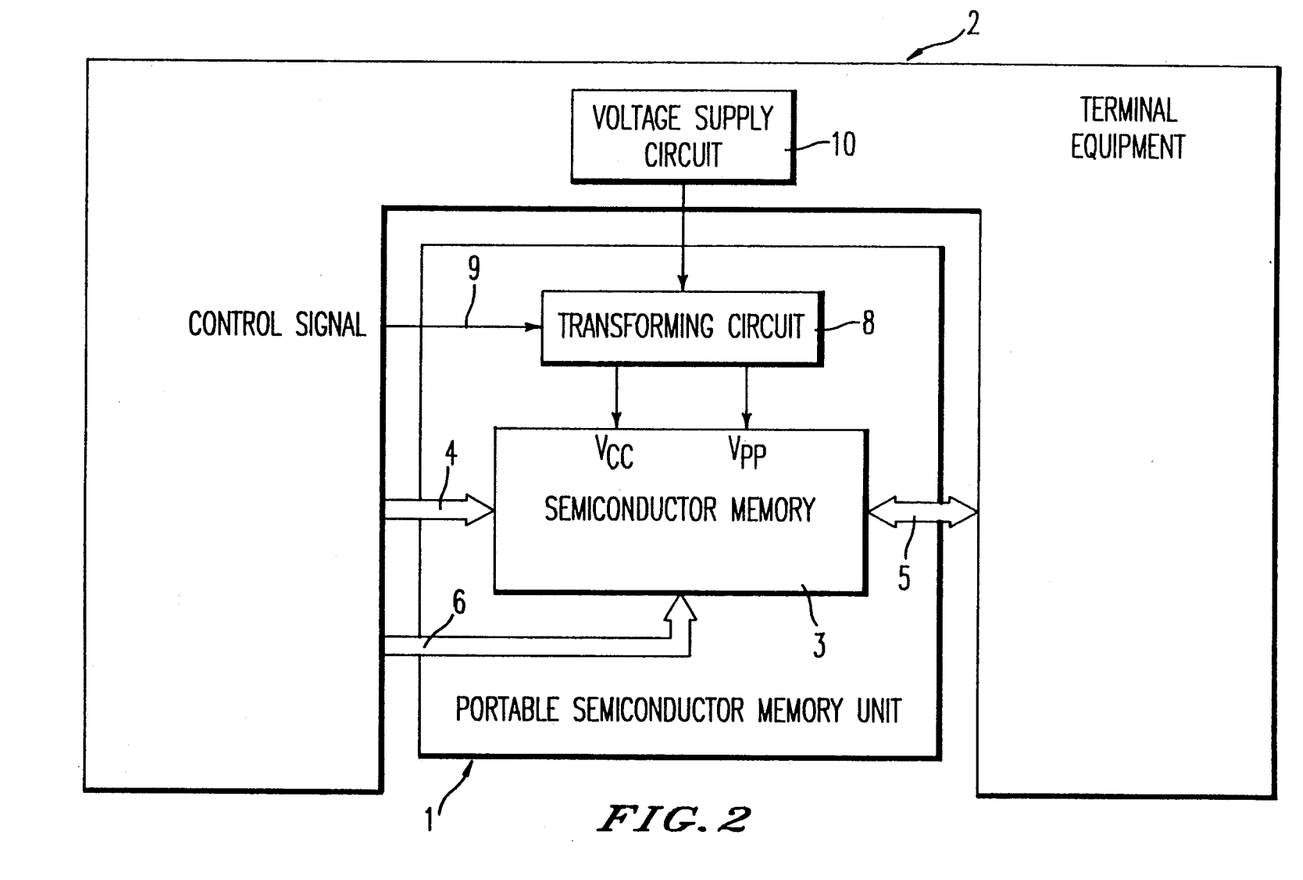
FIG. 2 is a block diagram showing a portable semiconductor memory unit according to the present invention.

FIG. 2 is a block diagram showing an embodiment of a portable semiconductor memory unit according to the present invention and a system to use it. An IC card 1, which is a kind of portable semiconductor memory unit, is provided with a transforming circuit 8 and a semiconductor memory 3 such as OTPROM and $E^2PROM$ which require different voltages in reading and writing. A terminal equipment 2, which is a part of an on-line system, for example, is equipped with a voltage supply circuit 10 for supplying a voltage. The voltage supply circuit 10 provides a single voltage to the IC card 1. This single voltage is transformed by a transforming circuit 8 provided in the IC card 1. The terminal equipment 2 also provides to the IC card 1 a control signal 9 for controlling the operation of the transforming circuit 8. When the level of the control signal 9 is set to low, the transforming circuit 8 performs transforming operation and, on the other hand, when the level of the control signal 9 is set to high, the transforming circuit 8 does not perform transforming operation. The terminal equipment 2 reads from and writes to the semiconductor memory 3 through a data bus 5 by providing address signals through an address bus 4 and read/write mode and other control signals through a control bus 6.

Suppose that the voltage supply circuit 10 provides a voltage equal in level to a voltage required in reading of the semiconductor memory 3, 5 V for example, to the IC card 1. At that time, when the terminal equipment 2 read from the semiconductor memory 3 of the IC card 1, the terminal equipment 2 set the level of the control signal 9 to high in order to set the transforming circuit 8 to non active. By this, a voltage (5 V) equal to the voltage from the voltage supply circuit 10 is supplied to both terminals Vcc and Vpp of the semiconductor memory 3. Thereafter, the terminal equipment 2 reads from the semiconductor memory 3 through the data bus 5 by providing address signals by the address bus 4 and providing read mode and other control signals by the control bus 6.

On the other hand, when the terminal equipment 2 writes to the semiconductor memory 3, the terminal equipment 2 set the level of the control signal 9 to low in order to set the transforming circuit 8 to active. In response to this, the transforming circuit 8 operates to transform the voltage supplied from the terminal equipment 2. Thus, different voltages, for example 6 V and 12.5 V, are supplied to the terminals Vcc and Vpp of the semiconductor memory 3, respectively. Thereafter, the terminal equipment 2 writes to the semiconductor memory 3 through the data bus 5 by providing address signals by address bus 4 and providing write mode and other control signals by the control bus 6.

In this embodiment, a central processing unit (CPU) may be additionally provided in an IC card 1 together with a semiconductor memory 3.

Figure 3:
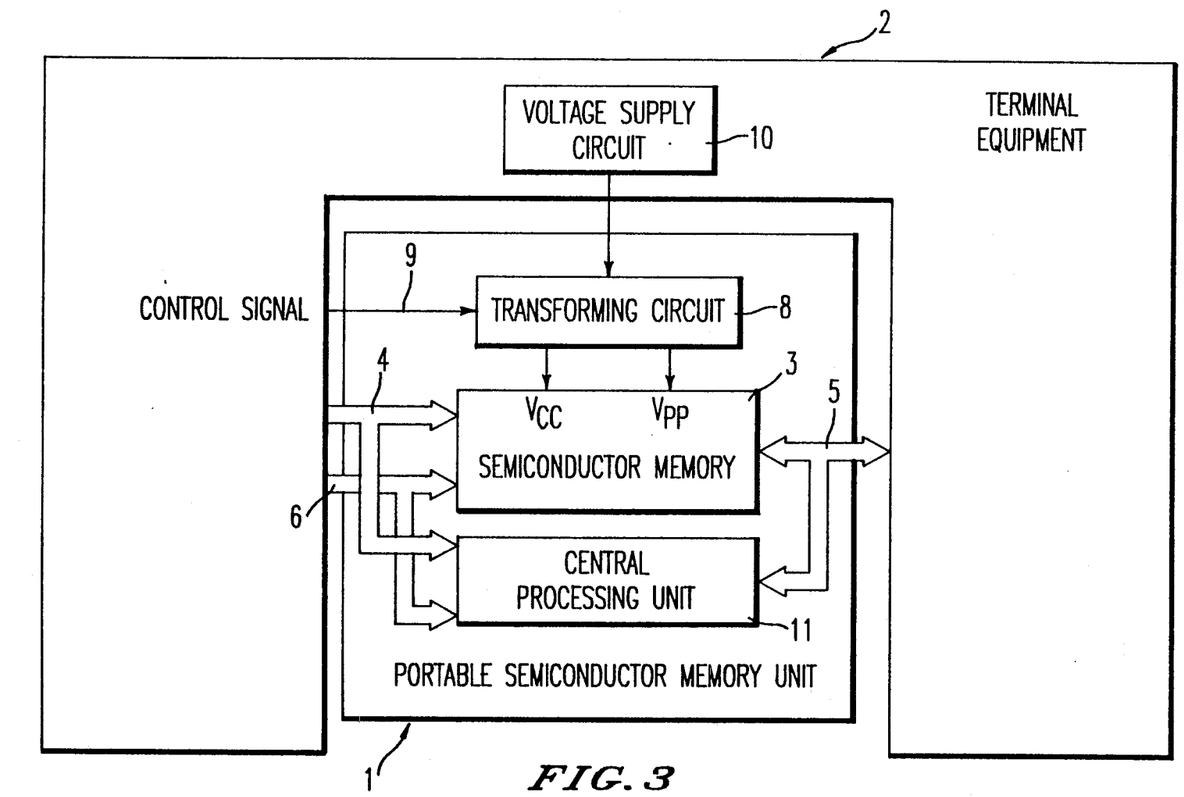
FIG. 3 is a block diagram showing a portable semiconductor memory unit provided with a central processing unit (CPU) together with a semiconductor memory.

FIG. 3 is a block diagram showing an IC card provided with a CPU 11 together with a semiconductor memory 3 and a system to use it. In the case where the CPU 11 is installed in the IC card 1, a terminal equipment 2 may directly write to or read from the semiconductor memory 3 through a data bus 5 by providing signals through an address bus 4 and a control bus 6, as stated with respect to FIG. 2. Instead of a direct writing to or reading from the semiconductor memory 3, the terminal equipment 2 may supply the CPU 11 with signals and data through the address bus 4, the control bus 6 and the data bus 5. Thereafter the CPU 11 may provide those signals and data supplied from the terminal equipment 2 to the semiconductor memory 3 so that writing to or reading from the semiconductor memory 3 can be performed.

Since the CPU 11 is operable to process signals and data supplied from the terminal equipment 2 through the address bus 4, the control bus 6, and the data bus 5 so as to provide them to the semiconductor memory 3, the installation of the CPU 11 in the IC card 1 brings about the improvement in processing capacity of the IC card 1.

Then, suppose that the voltage supply circuit 10 provides a voltage equal in level to a voltage to be applied to the terminal Vpp of the semiconductor memory 3 when writing, 12.5 V for example, to the IC card 1. At that time, when the terminal equipment 2 read from the semiconductor memory 3 of the IC card 1, the terminal equipment 2 set the level of the control signal 9 to low in order to set the transforming circuit 8 to active. In response to this, the transforming circuit 8 operates to transform the voltage supplied from the terminal equipment 2. Thus, a voltage, for example 5 V, is supplied to both the terminals Vcc and Vpp of the semiconductor memory 3. Thereafter, the terminal equipment 2 reads from the semiconductor memory 3 through the data bus 5 by providing address signals through the address bus 4 and providing read mode and other control signals through the control bus 6.

On the other hand, when the terminal equipment 2 writes to the semiconductor memory 3, the terminal equipment 2 set the level of the control signal 9 also to low in order to set the transforming circuit 8 to active. In response to this, the transforming circuit 8 operates to transform the voltage supplied from the terminal equipment 2 to provide a voltage, 6 V for example, to the terminal Vcc of the semiconductor memory 3. Besides, the voltage (12.5 V) provided from the terminal equipment 2 is directly supplied to the terminal Vpp of the semiconductor memories 3 by the transforming circuit 8. Thereafter, the terminal equipment 2 writes to the semiconductor memories 3 through the data bus 5 by providing address signals through the address bus 4 and providing write mode and other control signals through the control bus 6.

Figure 5A:
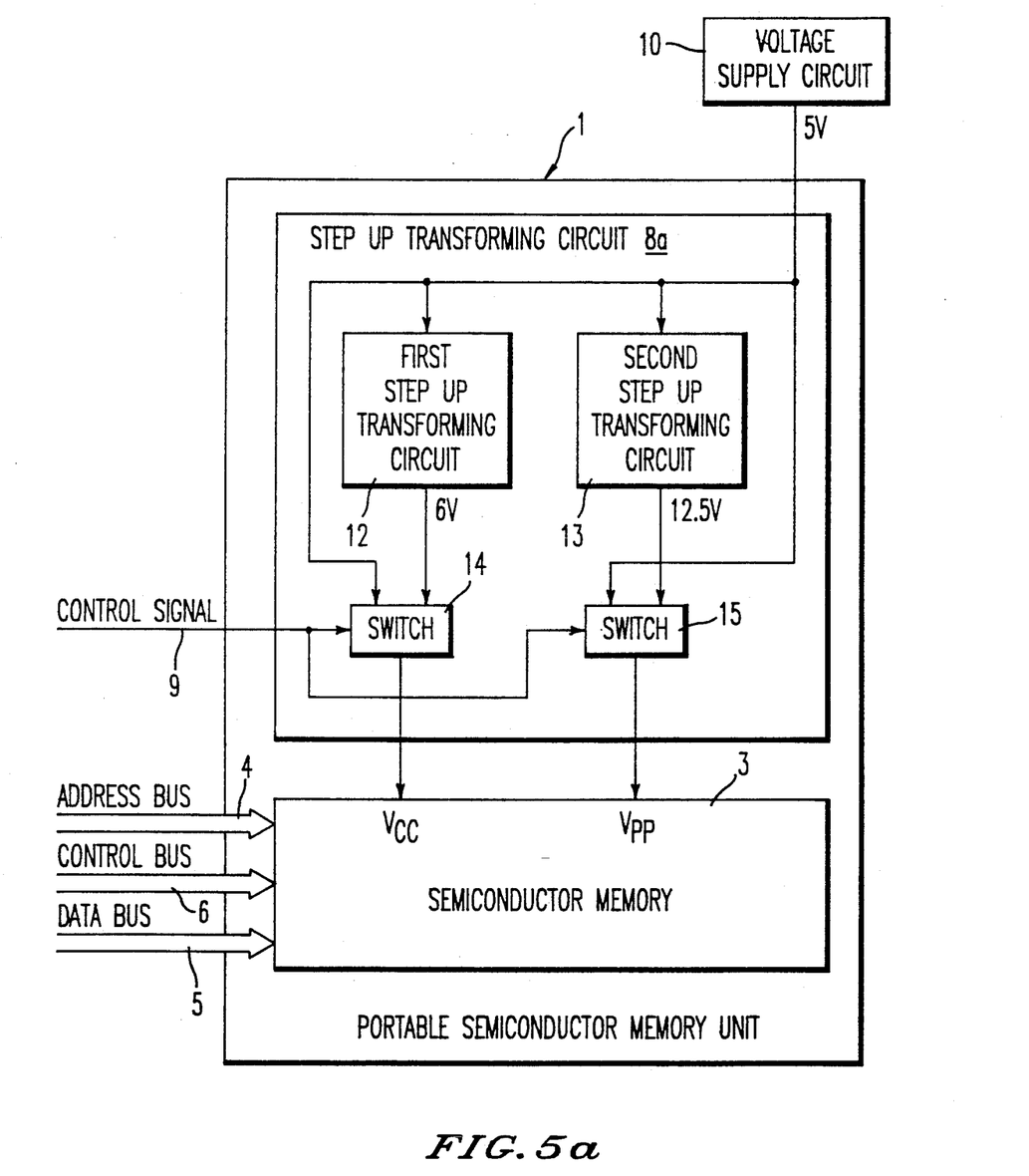
FIGS. 5A–5C are detailed block diagrams showing a portable semiconductor memory unit provided with a transforming circuit in the forms of a step-up transforming circuit, a step-down transforming circuit, and a step-up/down transforming circuit, respectively.
Figure 5B:
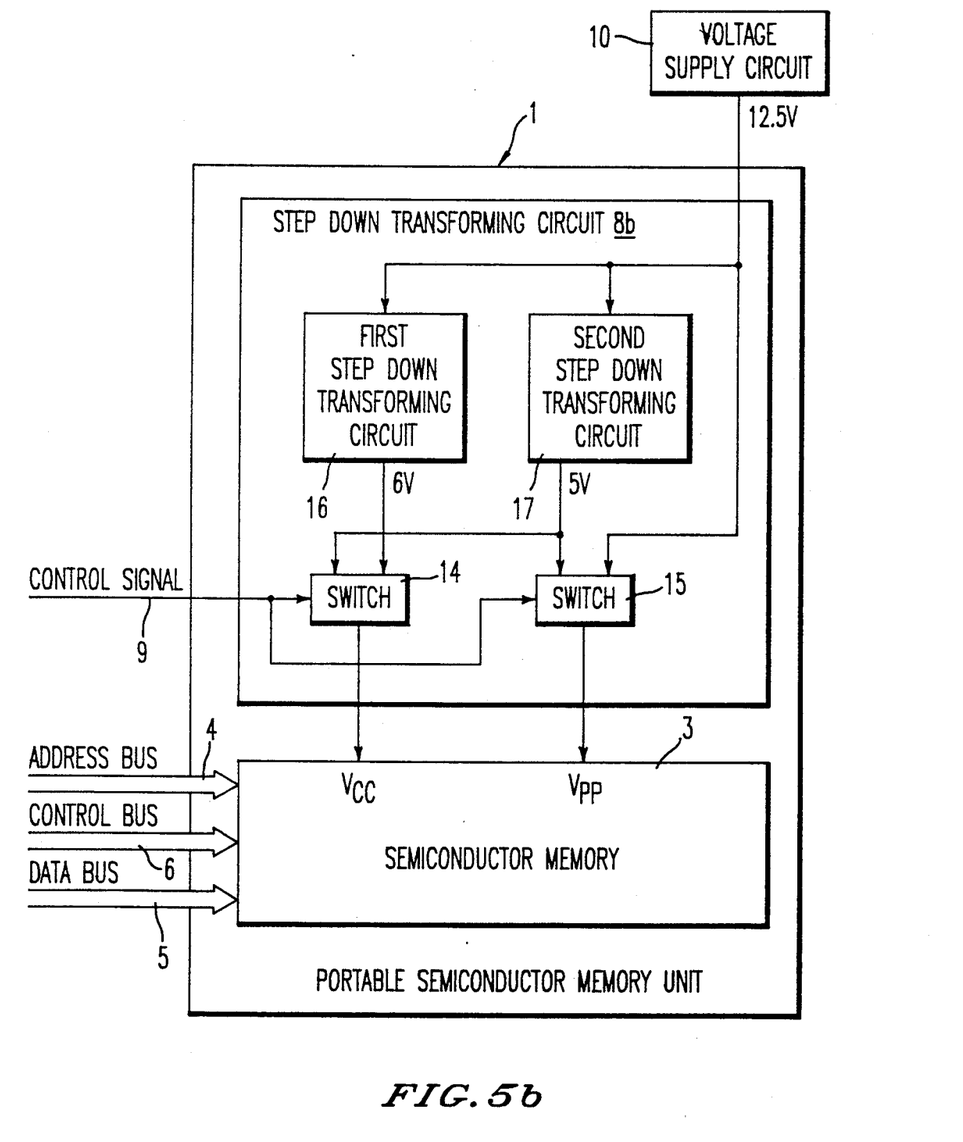
Figure 5C:
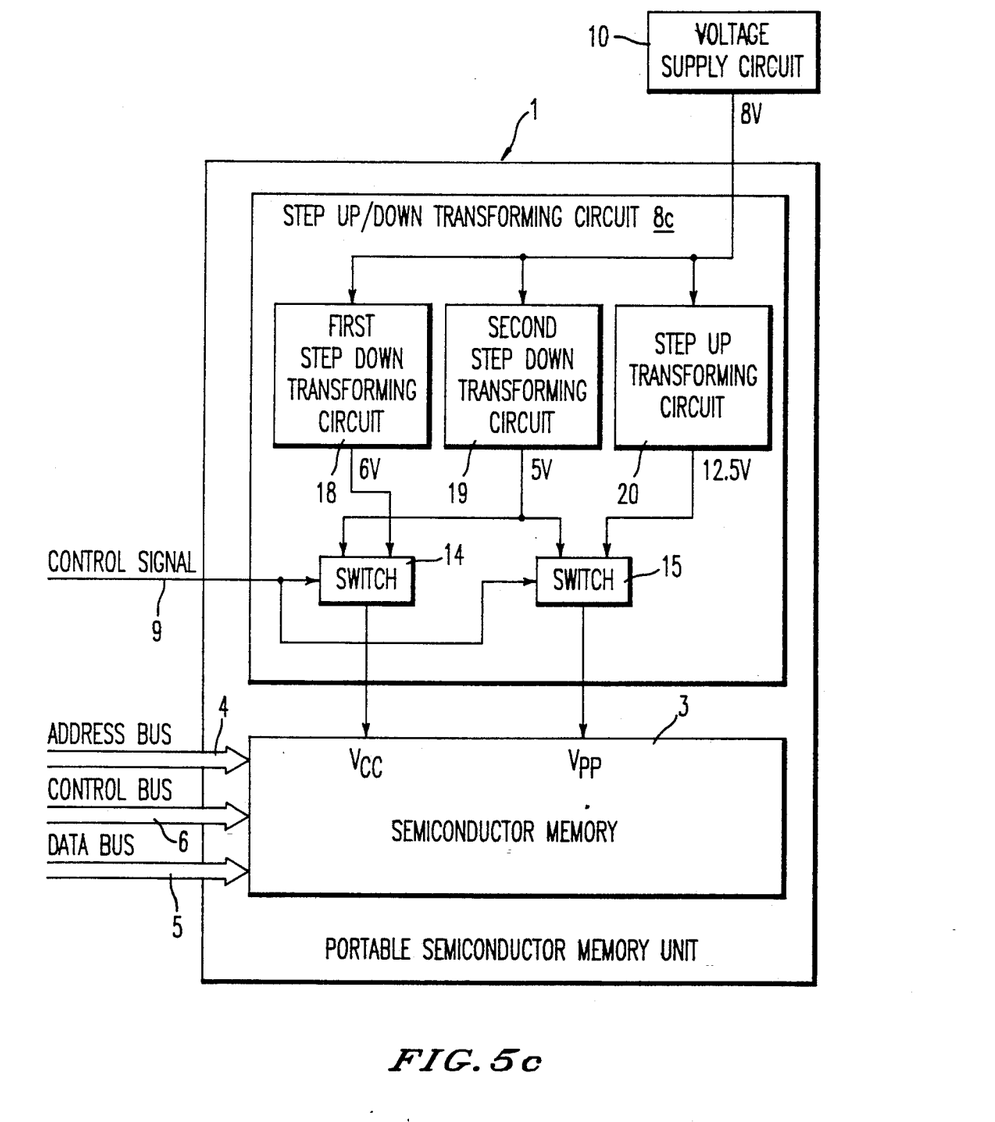

When the voltage supplied from the voltage supply circuit 10 in the terminal equipment 2 is the voltage of a level between the highest level and the lowest level required in reading and writing, the transforming circuit 8 takes the form of a step-up/down transforming circuit shown in FIG. 5.

Figure 4:
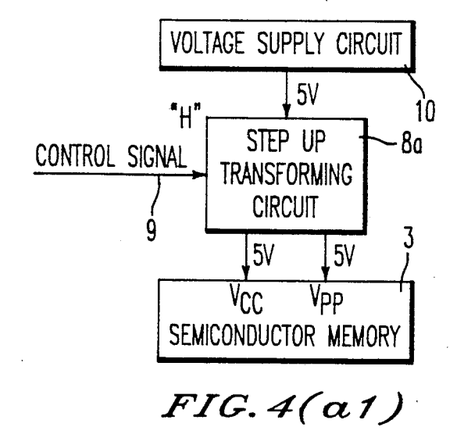

FIGS. 4(a1)-4(c2) are block diagrams showing examples of forms of a transforming circuit 8 in accordance with relations between a voltage supplied from a voltage supply circuit 10 and a voltage provided to the terminals Vcc and Vpp of a semiconductor memory 3.

First of all, when the voltage supplied from a voltage supply circuit 10 to a transforming circuit 8 is a voltage of the lowest level required in reading from or writing to a semiconductor memory 3, 5 V for example, the transforming circuit 8 takes the form of a step-up transforming circuit 8a as shown in FIGS. 4(a1) and 4(a2).

Under this condition, when a terminal equipment 2 (not shown in FIG. 4) reads from the semiconductor memory 3, the step-up transforming circuit 8a supplies both the terminals Vcc and Vpp of the semiconductor memory 3 with the voltage supplied from the voltage supply circuit 10, i.e. 5 V, respectively, without performing transforming operation, as shown in FIG. 4(a1).

On the other hand, when the terminal equipment 2 writes to the semiconductor memory 3, the step-up transforming circuit 8a operates to transform the voltage supplied from the voltage supply circuit 10, i.e. 5 V, into 6 V and 12.5 V, so as to provide 6 V and 12.5 V to the terminals Vcc and Vpp of the semiconductor memory 3, respectively, as shown in FIG. 4(a2).

Next, when the voltage supplied from a voltage supply circuit 10 to a transforming circuit 8 is a voltage of the highest level required in reading from or writing to a semiconductor memory 3, 12.5 V for example, the transforming circuit 8 takes the form of a step-down transforming circuit 8b, as shown in FIGS. 4(b1) and 4(b2).

Under this condition, when a terminal equipment 2 (not shown in FIG. 4) reads from the semiconductor memory 3, the step-down transforming circuit 8b operates to transform the voltage supplied from the voltage supply circuit 10, i.e. 12.5 V, into 5 V so as to provide 5 V to both the terminals Vcc and Vpp of the semiconductor memory 3, respectively.

On the other hand, when the terminal equipment 2 writes to the semiconductor memory 3, the step-down transforming circuit 8b directly provides the voltage supplied from the voltage supply circuit 10, i.e. 12.5 V, to the terminal Vpp of the semiconductor memory 3 without performing transforming operation, while transforming the voltage (12.5 V) into 6 V so as to provide 6 V to the terminal Vcc of the semiconductor memory 3.

Furthermore, when the voltage supplied from a voltage supply circuit 10 to a transforming circuit 8 is a voltage of level between the highest level and the lowest level required in reading and writing, 8 V for example, the transforming circuit 8 takes the form of a step-up/down transforming circuit 8c, as shown in FIGS. 4(c1) and 4(c2).

Under this condition, when a terminal equipment 2 (not shown in FIG. 4) reads from the semiconductor memory 3, the step-up/down transforming circuit 8c operates to transform the voltage supplied from the voltage supply circuit 10, i.e. 8 V, into 5 V, so as to provide 5 V to both the terminals Vcc and Vpp of the semiconductor memory 3, respectively.

On the other hand, when the terminal equipment 2 writes to the semiconductor memory 3, the step-up/down transforming circuit 8c operates to transform the voltage supplied from the voltage supply circuit 10, i.e. 8 V, into 6 V and 12.5 V so as to provide 6 V and 12.5 V to the terminals Vcc and Vpp of the semiconductor memory 3, respectively.

Each form of a transforming circuit 8 can be implemented by employing a charge-pomp type DC-DC converter or a switching regulator, for example.

FIG. 5A is a detailed block diagram showing the step-up circuit 8a shown in FIGS. 4(a1) and 4(a2). The voltage supplied from a voltage supply circuit 10, i.e. 5 V, is provided to first and second step-up transforming circuits 12 and 13, respectively, while being provided to the one input terminals of switches 14 and 15, respectively. The outputs of the first and the second step-up transforming circuits 12 and 13 are supplied to the other input terminals of switches 14 and 15, respectively. The outputs of switches 14 and 15 are supplied to the terminals Vcc and Vpp of the semiconductor memory 3, respectively. A control signal 9, which is an output signal of a terminal equipment 2, is provided to control signal inputting terminals of switches 14 and 15, respectively, so as to control which input should be outputted between the one supplied from the voltage supply circuit 10 and the one supplied from the step-up transforming circuit 12 or 13.

When the terminal equipment 2 reads from the semiconductor memory 3, the terminal equipment 2 sets the control signal 9 at level "L", for example, so as to provide the voltage supplied from the voltage supply circuit 10, i.e. 5 V, to both the terminals Vcc and Vpp of the semiconductor memory 3, respectively, instead of the one supplied from the step-up transforming circuit 12 or 13.

On the other hand, when the terminal equipment 2 writes to the semiconductor memory 3, the terminal equipment 2 sets the control signal 9 at level "H", for example, so as to provide the voltage outputted from the first and the second step-up transforming circuits 12 and 13 to the terminals Vcc and Vpp of the semiconductor memory 3, respectively, instead of the one supplied from the voltage supply circuit 10. Since the first step-up transforming circuit 12 operates to transform 5 V into 6 V, and the second transforming circuit 13 operates to transform 5 V into 12.5 V, the voltages 6 V and 12.5 V are provided to the terminals Vcc and Vpp of the semiconductor memory 3, respectively.

The step-down transforming circuit 8b shown in FIGS. 4(b1) and 4(b2) and the step-up/down transforming circuit 8c shown in FIGS. 4(c1) and 4(c2) can be implemented in the same way as the step-up transforming circuit 8a shown in FIG. 5A, and are shown in FIGS. 5B and 5C, respectively.

In the above embodiments, the semiconductor memory 3 of the IC card 1 is prepared by an OTPROM or an E$^2$PROM but it may be prepared by others such as an erasable programmable read only memory (EPROM) and a flash ROM which requires different voltages in writing and reading.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. A portable semiconductor memory unit system, comprising:
    a portable semiconductor memory unit;
    a terminal equipment for accessing said portable semiconductor memory unit, which provides a single supply voltage and a control signal,
    wherein said portable semiconductor memory unit comprises
    a semiconductor memory which requires different voltages in reading and writing;
    supply voltage inputting means for receiving said single supply voltage from said terminal equipment;
    control signal inputting means for receiving said control signal from said terminal equipment; and
    a transformer connected to said supply voltage inputting means and said control signal inputting means for transforming said supply voltage in accordance with said control signal to apply the same to said semiconductor memory.

2. A portable semiconductor memory unit system in accordance with claim 1, wherein;
    said single supply voltage is equal in level to a lowest voltage of said different voltages; and
    said transformer includes a step-up transforming circuit.

3. A portable semiconductor memory unit system in accordance with claim 1, wherein;
    said single supply voltage is equal in level to a highest voltage of said different voltages; and
    said transformer includes a step-down transforming circuit.

4. A portable semiconductor memory unit system in accordance with claim 1, wherein;
    said single supply voltage has a level between a highest and lowest level of said different voltages; and
    said transformer includes a step-up/down transforming circuit.

5. A portable semiconductor memory unit system in accordance with claim 1, further comprising a central processing unit.

* * * * *